US007512584B2

(12) United States Patent
Keith, Jr.

(10) Patent No.: US 7,512,584 B2
(45) Date of Patent: Mar. 31, 2009

(54) COMPUTER HARDWARE AND SOFTWARE DIAGNOSTIC AND REPORT SYSTEM

(75) Inventor: Robert O. Keith, Jr., Modesto, CA (US)

(73) Assignee: MaxSP Corporation, Sunnyvale, CA (US)

(*) Notice: Subject to any disclaimer, the term of this patent is extended or adjusted under 35 U.S.C. 154(b) by 0 days.

(21) Appl. No.: 11/368,214

(22) Filed: Mar. 2, 2006

(65) Prior Publication Data

US 2006/0224545 A1 Oct. 5, 2006

Related U.S. Application Data

(60) Provisional application No. 60/658,970, filed on Mar. 4, 2005.

(51) Int. Cl.
*G06N 5/00* (2006.01)

(52) U.S. Cl. .......................................... 706/60; 706/45

(58) Field of Classification Search .................. 706/45, 706/60; 709/223; 717/151, 174; 711/110; 715/513, 719
See application file for complete search history.

(56) References Cited

U.S. PATENT DOCUMENTS

| | | | | |
|---|---|---|---|---|
| 4,866,635 | A | 9/1989 | Kahn et al. .................. 364/513 |
| 5,602,990 | A | 2/1997 | Leete ...................... 395/183.22 |
| 5,649,196 | A | 7/1997 | Woodhill et al. ............. 395/620 |
| 5,659,743 | A | 8/1997 | Adams et al. ................ 395/621 |
| 5,974,547 | A | 10/1999 | Klimenko ....................... 713/2 |
| 6,012,152 | A | 1/2000 | Douik et al. .................... 714/26 |
| 6,029,196 | A | 2/2000 | Lenz ............................ 709/221 |
| 6,170,065 | B1 | 1/2001 | Kobata et al. ................... 714/7 |
| 6,209,089 | B1 | 3/2001 | Selitrennikoff et al. .......... 713/2 |
| 6,212,660 | B1 | 4/2001 | Joeressen et al. .............. 714/758 |
| 6,292,827 | B1 | 9/2001 | Raz ............................. 709/217 |
| 6,301,612 | B1 | 10/2001 | Selitrennikoff et al. ....... 709/220 |
| 6,311,221 | B1 | 10/2001 | Raz et al. ..................... 709/231 |
| 6,317,761 | B1 * | 11/2001 | Landsman et al. ........... 715/513 |
| 6,356,915 | B1 | 3/2002 | Chtchetkine et al. ......... 707/200 |
| 6,363,400 | B1 | 3/2002 | Chtchetkine et al. ......... 707/200 |
| 6,366,296 | B1 * | 4/2002 | Boreczky et al. ............. 715/719 |
| 6,378,035 | B1 * | 4/2002 | Parry et al. .................. 711/110 |
| 6,421,777 | B1 | 7/2002 | Pierre-Louis et al. ........... 713/2 |
| 6,449,658 | B1 | 9/2002 | Lafe et al. .................... 709/247 |

(Continued)

OTHER PUBLICATIONS http://www.backup.com.

(Continued)

*Primary Examiner*—Wilbert L Starks, Jr.
(74) *Attorney, Agent, or Firm*—Haverstock & Owens LLP

(57) ABSTRACT

The present invention tests computer systems for defects that are able to cause performance and functional problems. An agent application is first installed on a user's system. The agent application then retrieves problem data from the expert system library pertinent to the user's operating environment. The agent application tests the user's system for each problem description within a downloaded data structure from the expert system library. If a problem is discovered, a script attempts to remediate the problem and/or notifies the user, describing the issue. If an unknown problem arises, a feedback mechanism sends a notification to the expert system library that a problem was discovered. The feedback is then utilized to increase the total knowledge in the expert system library. Then when another user with a similar or the same setup is tested, the agent application will recognize the issue and will take the appropriate remedial actions.

72 Claims, 5 Drawing Sheets

U.S. PATENT DOCUMENTS

| | | | | |
|---|---|---|---|---|
| 6,463,530 | B1 | 10/2002 | Sposato | 713/2 |
| 6,473,794 | B1* | 10/2002 | Guheen et al. | 709/223 |
| 6,477,531 | B1 | 11/2002 | Sullivan et al. | 707/10 |
| 6,490,677 | B1 | 12/2002 | Aguilar et al. | 713/1 |
| 6,536,037 | B1* | 3/2003 | Guheen et al. | 717/151 |
| 6,556,950 | B1* | 4/2003 | Schwenke et al. | 702/183 |
| 6,574,618 | B2 | 6/2003 | Eylon et al. | 707/1 |
| 6,606,744 | B1* | 8/2003 | Mikurak | 717/174 |
| 6,636,857 | B2 | 10/2003 | Thomas et al. | 707/10 |
| 6,654,797 | B1 | 11/2003 | Kamper | 709/220 |
| 6,694,375 | B1 | 2/2004 | Beddus et al. | 709/249 |
| 6,718,464 | B2 | 4/2004 | Cromer et al. | 713/2 |
| 6,735,625 | B1 | 5/2004 | Ponna | 709/223 |
| 6,751,658 | B1 | 6/2004 | Haun et al. | 709/222 |
| 6,757,894 | B2 | 6/2004 | Eylon et al. | 717/177 |
| 6,816,462 | B1 | 11/2004 | Booth, III et al. | 370/248 |
| 6,871,210 | B1 | 3/2005 | Subramanian | 709/203 |
| 6,886,020 | B1 | 4/2005 | Zahavi et al. | 707/204 |
| 6,915,343 | B1 | 7/2005 | Brewer et al. | 709/224 |
| 6,954,930 | B2 | 10/2005 | Drake et al. | |
| 7,210,143 | B2 | 4/2007 | Or et al. | |
| 2001/0034736 | A1 | 10/2001 | Eylon et al. | 707/200 |
| 2001/0037323 | A1 | 11/2001 | Moulton et al. | 707/1 |
| 2001/0037399 | A1 | 11/2001 | Eylon et al. | 709/231 |
| 2001/0037400 | A1 | 11/2001 | Raz et al. | 709/232 |
| 2001/0044850 | A1 | 11/2001 | Raz et al. | 709/231 |
| 2001/0049793 | A1 | 12/2001 | Sugimoto | 713/200 |
| 2002/0007418 | A1 | 1/2002 | Hegde et al. | 709/231 |
| 2002/0042833 | A1 | 4/2002 | Hendler et al. | 709/231 |
| 2002/0049764 | A1 | 4/2002 | Boothby et al. | 707/100 |
| 2002/0083183 | A1 | 6/2002 | Pujare et al. | 709/231 |
| 2002/0087717 | A1 | 7/2002 | Artzi et al. | 709/236 |
| 2002/0087883 | A1 | 7/2002 | Wohlgemuth et al. | 713/201 |
| 2002/0087963 | A1 | 7/2002 | Eylon et al. | 717/174 |
| 2002/0091763 | A1 | 7/2002 | Shah et al. | 709/203 |
| 2002/0116585 | A1 | 8/2002 | Scherr | 711/133 |
| 2002/0124092 | A1 | 9/2002 | Urien | 709/229 |
| 2002/0129089 | A1 | 9/2002 | Hegde et al. | 709/200 |
| 2002/0138640 | A1 | 9/2002 | Raz et al. | 709/231 |
| 2002/0157089 | A1 | 10/2002 | Patel et al. | 717/178 |
| 2002/0161868 | A1 | 10/2002 | Paul et al. | 709/221 |
| 2002/0161908 | A1 | 10/2002 | Benitez et al. | 709/231 |
| 2002/0169797 | A1 | 11/2002 | Hegde et al. | 707/500.1 |
| 2002/0188941 | A1 | 12/2002 | Cicciarelli et al. | |
| 2003/0004882 | A1 | 1/2003 | Holler et al. | 705/51 |
| 2003/0005096 | A1 | 1/2003 | Paul et al. | 709/222 |
| 2003/0009538 | A1 | 1/2003 | Shah et al. | 709/219 |
| 2003/0033379 | A1 | 2/2003 | Civanlar et al. | 709/218 |
| 2003/0041136 | A1 | 2/2003 | Cheline et al. | 709/223 |
| 2003/0051128 | A1 | 3/2003 | Rodriguez et al. | 713/100 |
| 2003/0110188 | A1 | 6/2003 | Howard et al. | 707/200 |
| 2003/0126242 | A1 | 7/2003 | Chang | 709/222 |
| 2003/0140160 | A1 | 7/2003 | Raz et al. | 709/231 |
| 2003/0191730 | A1 | 10/2003 | Adkins et al. | |
| 2004/0093492 | A1 | 5/2004 | Daude et al. | 713/156 |
| 2004/0104927 | A1 | 6/2004 | Husain et al. | |
| 2004/0123153 | A1 | 6/2004 | Wright et al. | 713/201 |
| 2004/0128346 | A1 | 7/2004 | Melamed et al. | 709/203 |
| 2004/0148306 | A1 | 7/2004 | Moulton et al. | 707/101 |
| 2004/0201604 | A1 | 10/2004 | Kraenzel et al. | 345/700 |
| 2004/0236843 | A1 | 11/2004 | Wing et al. | 709/219 |
| 2005/0027846 | A1 | 2/2005 | Wolfe et al. | |
| 2005/0044544 | A1 | 2/2005 | Slivka et al. | |
| 2005/0144218 | A1 | 6/2005 | Heintz | 709/202 |
| 2005/0149729 | A1 | 7/2005 | Zimmer et al. | 713/168 |
| 2005/0273486 | A1 | 12/2005 | Keith, Jr. | 709/200 |
| 2005/0283606 | A1 | 12/2005 | Williams | 713/166 |
| 2006/0021040 | A1 | 1/2006 | Boulanger et al. | 726/23 |
| 2006/0031529 | A1 | 2/2006 | Keith, Jr. | 709/227 |
| 2006/0047716 | A1 | 3/2006 | Keith, Jr. | 707/203 |
| 2006/0047946 | A1 | 3/2006 | Keith, Jr. | 713/2 |
| 2006/0095705 | A1 | 5/2006 | Wichelman et al. | 711/171 |
| 2006/0143709 | A1 | 6/2006 | Brooks et al. | 726/23 |
| 2006/0224544 | A1 | 10/2006 | Keith, Jr. | 706/60 |
| 2007/0233633 | A1 | 10/2007 | Keith, Jr. | 706/60 |
| 2007/0239905 | A1 | 10/2007 | Banerjee et al. | 710/22 |
| 2007/0271290 | A1 | 11/2007 | Keith, Jr. | 707/101 |
| 2007/0274315 | A1 | 11/2007 | Keith | 370/392 |
| 2008/0077622 | A1 | 3/2008 | Keith | 707/200 |
| 2008/0077630 | A1 | 3/2008 | Keith | 707/204 |
| 2008/0127294 | A1 | 5/2008 | Keith | 726/1 |

OTHER PUBLICATIONS http://www.swapdrive.com/sdbackup.asp.
http://www.macrovision.com/products/flexnet_installshield/installshield/overview/index.shtml.
http://www.macrovision.com/products/flexnet_installshield/index.shtml.
http://www.stealthbits.com/.
http://www.microsoft.com/technet/prodtechnol/windows2000serv/maintain/featusability/inmnwp.mspx.
http://en.wikipedia.org/wiki/Expert_system.
http://www.pctools.com/registry-mechanic/.

* cited by examiner

```xml
<diag>
   <id>5</id>
   <version>1.0</version>
   <date_created>1.0</date_created>
   <date_modified>1.0</date_modified>
   <maxsp_url></maxsp_url>
   <order>3</order>
   <name>Ethernet card errors</name>
   <category>hardware</category>
   <family>Hardware Management</family>
   <repairable>no</repairable>
   <desc_language>English</desc_language>
   <desc>Your ethernet card is reporting errors. This may be due to faulty
         network card, cable or other hardware.
   <remediation>1. First, replace your ethernet cable or re-seat the
         cables. 2. You may need to replace the ethernet card.
   </remediation>
   <script_lang>max1</script_lang>
   <diag_script>
        let ethers = F$GETWMI('ethport1', 'counters')
        If (ethers > 0) then
             F$TMPSTOR('ethernet counters', ethers)
             Return 8
        endif
   </diag_script>
   <repair_script></repair_script>
   <platforms>Windows</platforms>
   <dependency></dependency>
   <confidence><confidence>
   <health_index></health_index>
</diag>
```

Fig. 4

COMPUTER HARDWARE AND SOFTWARE DIAGNOSTIC AND REPORT SYSTEM

RELATED APPLICATION(S)

This Patent Application claims priority under 35 U.S.C. §119(e) of the co-owned U.S. Provisional Patent Application, Ser. No. 60/658,970, filed Mar. 4, 2005, and entitled "PRE-INSTALL COMPLIANCE AND CENTRAL PROBLEM DISCOVERY SYSTEM." The Provisional Patent Application, Ser. No. 60/658,970, filed Mar. 4, 2005, and entitled "PRE-INSTALL COMPLIANCE AND CENTRAL PROBLEM DISCOVERY SYSTEM" is also hereby incorporated by reference in its entirety.

The following co-owned, co-filed, co-pending U.S. patent application, Ser. No. 11/368,212 filed Mar. 2, 2006 and entitled PRE-INSTALL COMPLIANCE SYSTEM is also incorporated by reference.

FIELD OF THE INVENTION

The present invention relates to the field of computer system maintenance. More specifically, the present invention relates to the field of testing computer systems for configuration problems and providing remediation solutions to the discovered problems.

BACKGROUND OF THE INVENTION

With the complexity and interoperability of software and hardware today, it is very difficult to install or remove one program without having an effect on one or more pre-existing programs. Microsoft® Windows® operating systems as well as other operating systems have a plethora of components that all must maintain their integrity, otherwise the operating system becomes unstable and possibly fails. Furthermore, generally when hardware is installed, software drivers which allow the hardware to communicate with the software must be installed as well. If these drivers are corrupted, the hardware will not function properly. Additionally, many software programs have components beyond a main executable file which allow the programs to communicate with the operating system, and if these components are deleted or modified incorrectly, the program will no longer function. All of these components, whether they be part of the operating system, hardware or other software, must be able to co-exist without harming each other. Specifically, when the system is modified in some way such as by installing or removing a piece of hardware or a software program, the system should do it so that everything still functions correctly. Furthermore, over time, modifications are made to the system such as updating drivers and installing patches, and these modifications may adversely affect other components of the system. Also, if a user neglects to update his system, he could leave the system open to attacks by viruses or other intruders. So either by action or inaction, a user's system has the potential for issues, and such issues should be monitored.

There are many products which monitor a system or attempt to repair components of the system, but they all have their shortcomings and do not provide the full package to adequately ensure a stable system environment.

Windows® registry repair programs such as Registry Mechanic™ developed by PC Tools™ aid a user in cleaning, repairing and optimizing the Windows® registry. Registry Mechanic™ uses a detection algorithm to scan a user's registry and identify missing and invalid references in a user's registry. Then a list is provided of the registry errors found, so that a user is able to selectively choose to clean each item or automatically repair all of them.

BMC Software and Computer Associates International develop performance software, but these software packages tend to be host based software products.

Other products like security vulnerability scanning software, spyware/virus scanners and patch management software assist in maintaining a stable computing environment. Very well known companies like McAfee and Symantec develop virus scanners to protect a user's computer from being harmed by viruses. Viruses are computer programs which have the ability to disrupt and damage a user's system. The products from these companies are able to scan a user's system and locate irregular programs that fit certain definitions stored in a database. Upon detecting a virus, a user is able to remove the problem and hopefully avoid harm to his computer system. STEALTHbits Technologies develops a program called stealthAUDIT for Exchange. The program is an agentless auditing and conformance management platform that enables users to identify changes in the system to avoid problems by performing discreet patch scanning. However, these products are very focused exclusively on their specific areas of technology such as virus checking or patch management and do not include an entire package for maintaining system stability.

There are significant problems with the aforementioned options. They are not necessarily end user friendly. They do not focus on overall user support or computer reliability. They are not Application Service Provider (ASP) friendly. Furthermore, they lack other significant features. Hence, a solution is needed to overcome these issues.

SUMMARY OF THE INVENTION

The present invention tests computer systems for defects that are able to cause performance and functional problems. An agent application is first installed on a user's system. The agent application then retrieves problem data from the expert system library pertinent to the user's operating environment. The agent application tests the user's system for each problem description within a downloaded data structure from the expert system library. If a problem is discovered, then a script attempts to remediate the problem and/or a notification is sent to the user describing the issue. If an unknown problem arises, a feedback mechanism sends a notification to the expert system library that a problem was discovered. The feedback is then utilized to increase the total knowledge in the expert system library. Then when another user with a similar or the same setup is tested, the agent application will recognize the issue and will take the appropriate remedial actions.

In one aspect, a system for detecting problems within a computer system comprises an expert system library for storing information including system data and an agent coupled to the expert system library for using the information stored in the expert system library to detect and resolve one or more problems. The system further comprises a feedback mechanism for sending feedback to the expert system library. The feedback is data related to a conflict. The system data relates to one or more software packages, hardware devices and operating systems. The system data further relates to one or more conflicts between the software packages, hardware devices or operating systems. The system further comprises one or more scripts for remedying the one or more problems. The system further comprises a reporting mechanism to report the one or more problems. The expert system library receives input from multiple sources. The system is implemented on an application service provider infrastructure.

Business enterprise applications are implemented on the system. The system functions offline. The system is scaleable to support large application service provider bases. The system is implemented on disparate network topologies. The system further comprises a license/subscription scheme. The expert system library is contained on one or more servers. The one or more servers are selected from the group consisting of entry-level servers, mid-range servers, enterprise servers, personal computers, Apple computers, thin clients, laptops, cell phones and PDAs. The agent is contained on one or more computing devices. The computing devices are selected from the group consisting of personal computers, Apple computers, thin clients, laptops, cell phones and PDAs. The agent functions on an operating system selected from the group consisting of Microsoft® Windows®, Microsoft® CE, Unix, Linux, handheld operating systems and cell phone operating systems. The system is implemented on a network. The expert system library and the agent are not on the same computing device or server.

In another aspect, a system for detecting problems within a computer system comprises one or more servers, one or more computing devices coupled to the one or more servers for computing data, an expert system library contained within the one or more servers for storing information including system data, an agent contained within the one or more computing devices for using the information stored in the expert system library to check for and resolve problems and a feedback mechanism contained within the one or more computing devices for sending feedback to the expert system library. The feedback is information related to a conflict. The system data relates to one or more software packages, hardware devices and operating systems.

The system data further relates to one or more conflicts between the software packages, hardware devices or operating systems. The system further comprises one or more scripts for remedying the one or more problems. The system further comprises a reporting mechanism to report the one or more problems. The expert system library receives input from multiple sources. The system is implemented on an application service provider infrastructure. Business enterprise applications are implemented on the system. The system functions offline. The system is scaleable to support large application service provider bases. The system is implemented on disparate network topologies. The system further comprises a license/subscription scheme. The one or more computing devices are selected from the group consisting of personal computers, Apple computers, thin clients, laptops, cell phones and PDAs. The one or more servers are selected from the group consisting of entry-level servers, mid-range servers, enterprise servers, personal computers, Apple computers, thin clients, laptops, cell phones and PDAs. The agent functions on an operating system selected from the group consisting of Microsoft® Windows®, Microsoft® CE, Unix, Linux, handheld operating systems and cell phone operating systems. The system is implemented on a network. The expert system library and the agent are not on the same computing device or server.

In yet another aspect, a method of detecting problems within a computer system comprises interrogating a computing device for environment information, retrieving data from an expert system library related to the environment information and testing the computing device for one or more problems. The method further comprises reporting the one or more problems to a user. The method further comprises initiating one or more remediation scripts if the one or more problems are detected. The method further comprises sending feedback to the expert system library. The expert system library receives input from multiple sources. The method is implemented on an application service provider infrastructure. Business enterprise applications are implemented on the computing device. The method functions offline. The method is scaleable to support large application service provider bases. The method is implemented on disparate network topologies. The method further comprises implementing a license/subscription scheme. The expert system library is contained on one or more servers. The one or more servers are selected from the group consisting of entry-level servers, mid-range servers, enterprise servers, personal computers, Apple computers, thin clients, laptops, cell phones and PDAs. The computing device is selected from the group consisting of a personal computer, an Apple computer, a thin client, a laptop, a cell phone and a PDA. The method is implemented on a network.

In another aspect, a network of devices for detecting problems within a computer system comprises one or more servers, one or more computing devices coupled to the one or more servers for computing data, an expert system library contained within the one or more servers for storing information including system data, an agent contained within the one or more computing devices for using the information stored in the expert system library to check for and resolve problems and a feedback mechanism contained within the one or more computing devices for sending feedback to the expert system library. The feedback is information related to a conflict. The system data relates to one or more software packages, hardware devices and operating systems. The system data further relates to one or more conflicts between the software packages, hardware devices or operating systems. The network of devices further comprises one or more scripts for remedying the one or more problems. The network of devices further comprises a reporting mechanism to report the one or more problems. The expert system library receives input from multiple sources. The network of devices is implemented on an application service provider infrastructure. Business enterprise applications are implemented on the network of devices. The network of devices functions offline. The network of devices is scaleable to support large application service provider bases. The network of devices is implemented on disparate network topologies. The network of devices further comprises a license/subscription scheme. The one or more computing devices are selected from the group consisting of personal computers, Apple computers, thin clients, laptops, cell phones and PDAs. The one or more servers are selected from the group consisting of personal computers, Apple computers, thin clients, laptops, cell phones and PDAs. The agent functions on an operating system selected from the group consisting of Microsoft® Windows®, Microsoft® CE, Unix, Linux, handheld operating systems and cell phone operating systems. The expert system library and the agent are not on the same computing device or server.

BRIEF DESCRIPTION OF THE DRAWINGS

FIG. 4 illustrates an example XML coded version of a data structure for the expert system library.

DETAILED DESCRIPTION OF THE PREFERRED EMBODIMENT

Figure 1:
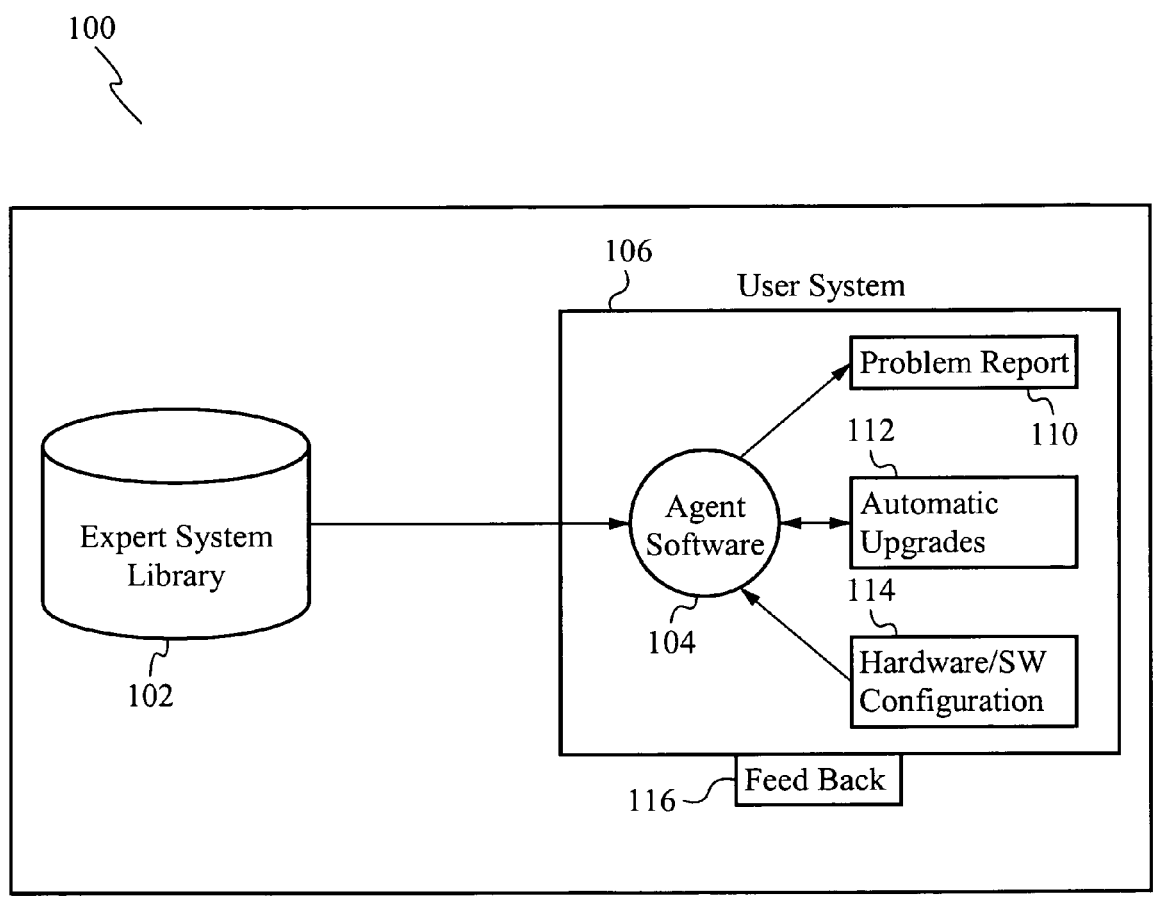
FIG. 1 illustrates a block diagram representation of the main components of the preferred embodiment of the present invention.

The present invention is a system for using an expert system library of computer configuration problems to test individual computer systems for the existence of problems and then providing remediation solutions for each discovered problem. The system enables maintenance procedures and requirements for system competence to be centralized and distributed, providing an end user a solution to scan his system for configuration problems and to manually or automatically resolve these problems. Configuration problems include, but are not limited to, incomplete software package install and de-installs, incorrect Windows® registry values, software release and patch release issues, software driver problems, network configuration and connectivity, performance issues and many other problems.

The present invention provides the ability to build a central expert system library repository with constructive input from multiple sources. The system is also able to support an application service provider (ASP) infrastructure and business enterprise applications. Furthermore, software applications have the ability to run disconnected from the central server and network. The system is scaleable so that it has the ability to support extremely large ASP user bases over disparate network topologies. The system supports subscription licenses, so that when the subscription is void or expired, the desktop software will be disabled and inactive. The system also supports disparate end-user hardware including Personal Computers (PCs), Apple PC's, thin clients, laptops, cell phones, PDA's and other mobile devices. The present invention utilizes a plug-in model so that each entry in the expert system library is discrete, allowing multiple authors to add to the central repository independently.

The present invention generally comprises four main components: a central compatibility expert system library, a host resident client interrogation agent, problem reporting and remediation mechanisms and a user support feedback mechanism.

Any of the many software and hardware configuration problems is able to be described discretely. Each problem, when stored in a format usable by software resident on an end-user's system, is able to be processed serially, meaning one problem at a time. In an alternative embodiment, problems are processed in parallel, meaning at the same time. The central expert system library stores the problem and resolution information. The information is able to be retrieved and communicated to end-user clients via a problem language and protocol. The information stored includes shared software module names and revisions, hardware driver prerequisites, hardware requirements, operating system revision levels and other operating environment prerequisites. The expert system library also contains software and hardware exceptions.

Agent software installed on an end user's system is resident and thereby able to interrogate the user's system for hardware and software configurations. The information obtained by the interrogation is used in conjunction with the expert system library to ascertain whether there are problems on an end-user's system. The expert system library describes individual prerequisites such as software versions, registry values and hardware and software configurations which are invalid or problematic. The agent application then uses the information to interrogate the client system for the existence of these problems.

Contained within the expert system library is also information describing the resolution of problems. The descriptions range from simple to complex and are able to include a variety of data such as user instructions on problem resolution or scripts which automatically resolve the end-user configuration problem. Resolutions include, but are not limited to, removal/cleanup of software de-installations, removal of invalid configuration information, install patches and others.

The present invention when used by a larger support organization is able to be an extremely valuable system to end users. Each time a customer reports a problem and the support organization corrects the problem within the software deployment, the correction procedure or script is added to the central expert system library. The feedback mechanism will continuously expand the expert system library and ensure each new software system is tested for a wider and more comprehensive group of problems and has solutions to resolve such problems. Once the expert system library has stored every possible problem, all customers of the support organization are able to potentially have their systems run securely with high stability.

FIG. 1 illustrates a block diagram representation of the main components of the preferred embodiment of the present invention 100. In the preferred embodiment of the present invention, an expert system library 102 stores information about software packages and hardware and software configurations 114 required to support the software packages. An agent application 104 is located on one or more user systems. The agent application 104 interrogates the user system 106 for hardware and application configurations. Using the information obtained from the interrogations, the agent application 104 is able to determine if there are any problems. If there are any problems, then the agent application 104 reports the problem to the end-user and/or initiates a remediation script to repair the problem. Furthermore, the agent application 104 is able to receive automatic upgrades 112 so that it is able to continue protecting against improper installations and also automatically upgrade the user system 106. A feedback mechanism 116 sends any newly discovered problem information to the expert system library 102, so that the expert system library 102 is able to incorporate such a problem and will be able to detect and resolve it in the future. The expert system library 102 is able to continuously grow so that it is able to detect more and more issues as time passes. All of the components of the preferred embodiment of the present invention function to assist a user in detecting conditions that will potentially corrupt the user system 106 and then grow the expert system library 102 when new issues are discovered, so that they will be detected in other systems in the future.

Figure 2:
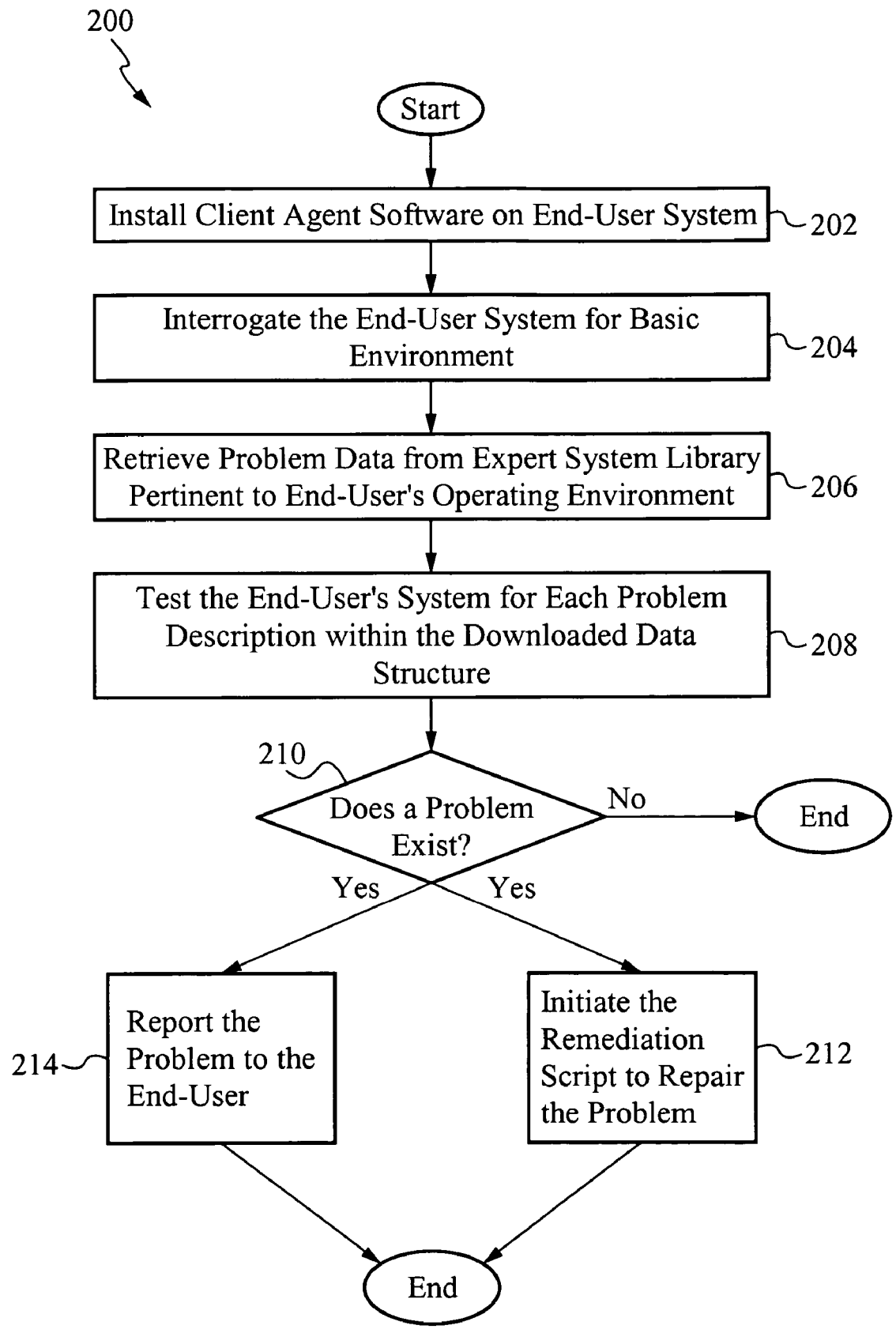
FIG. 2 illustrates a flowchart of the agent application determining if there are any problems.

FIG. 2 illustrates a flowchart of the agent application determining whether there is a problem that needs to be remedied 200. At the step 202, the agent application is installed on the end-user's system. The agent application is able to come pre-installed on a user's system or a user is able to download the agent application as needed. At the step 204, the agent application interrogates the end-user system for the basic environment. At the step 206, the agent application retrieves problem data from the expert system library pertinent to the end-user's operating environment. For example, if the operating environment is Windows® NT, then problem data related to Windows® NT is retrieved. At the step 208, the agent application tests the end-user's system for each problem description within the downloaded data structure. At the step 210, the agent application determines if any of the problems are detected. If the end-user system does have problems, then the agent application either reports the problems to the end-user at the step 214 and/or initiates the remediation script to repair the problem at the step 212.

There are a wide range of problem conditions that the end-user system is able to detect in the step 210. The following are examples of problem conditions tested by the agent application; however, they are not meant to limit the invention in any way. Software is tested for problems such as problematic software patch revisions, incompatible software packages, problematic software installations and problematic software package un/de-installations. The operating system is also checked, such as Windows® registry corruption and existing performance issues. Environmental issues are investigated such as low disk space or hardware errors. Network issues are checked such as interface errors, DNS or IP configuration problematic, IP routing failure and ISP network performance. Other important elements of a secure system are investigated such as detecting viruses, driver problems and serious security vulnerabilities. Any issues that could create system instability are also able to be investigated.

Figure 3:
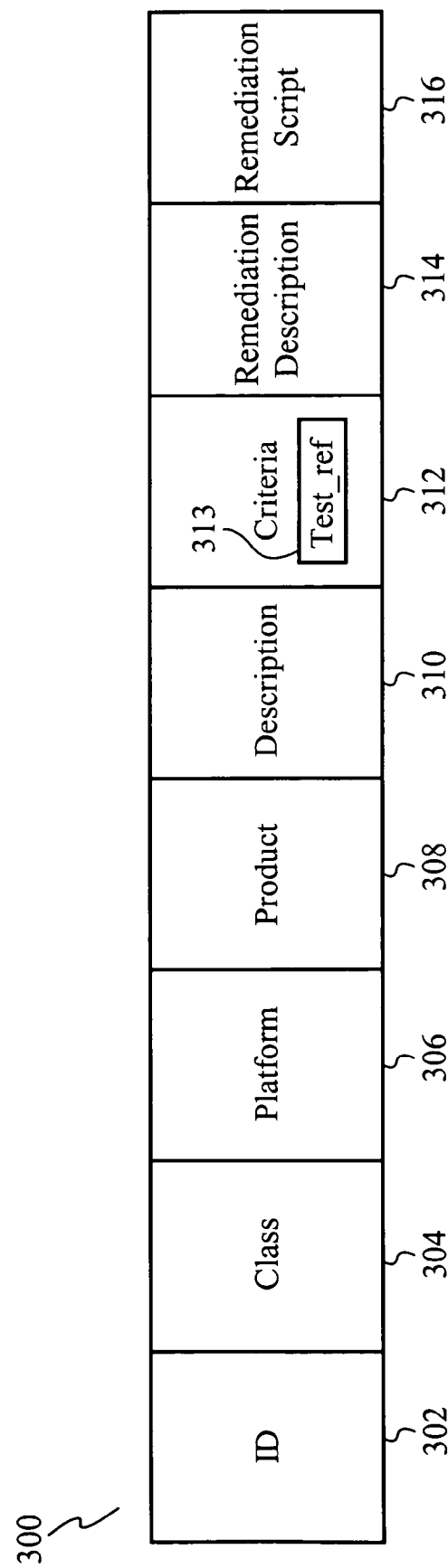
FIG. 3 illustrates an example data structure for the expert system library.

FIG. 3 illustrates an example data structure for the expert system library. The expert system library transfers data structures to the agent so that the client is able to perform checks to determine if there are any problems. The preferred format for the data structures is an embedded language with XML wrapping, although any format is acceptable. The example data structure 300 has the following item definitions within it. An ID item 302 stores the test record number. A class item 304 holds the type of test to be performed, such as performance, software patch level, security, virus or software inconsistency. A platform item 306 stores the operating system environment information, for example Windows NT, ME or XP. A product item 308 contains the affected application's information. The product item 308 is a specific component that needs to be investigated such as the Windows Shell or a specified application. A description item 310 stores a detailed description of the problem described. A criteria item 312 holds the subroutine used to identify test criteria. Within the criteria item 312, a test_ref subroutine 313 is used to identify test criteria. Although only one test_ref subroutine 313 is shown in FIG. 3, the criteria item 312 is able to hold a number of test_ref subroutines 313 depending on what test criteria is needed. A remediation description item 314 contains instructions on how to repair the problem described, and a remediation script item 316 stores one or more scripts to automatically remediate the problem described.

FIG. 4 illustrates an example XML coded version of a data structure of the expert system library. In the example, the ID item is "5." The platform item is "Windows." Furthermore, the category is "hardware" and the family is "Hardware Management." Hence, the agent application knows that it needs to investigate issues concerning hardware management of Windows®. Additional items are able to be included in the data structure as well such as a dependency, confidence and health index. The date_created and date_modified items are useful in determining when the data structure was created or modified which helps in the process of problem solving. The description item describes the problem, which in this example, is that the "ethernet card is reporting errors." Diagnostic script language is included to determine the status of the hardware or software. Remediation information is used to help resolve the problem, such as a suggestion to "replace your ethernet cable." If proper, a remediation script is included to automatically correct the problem. As described above, in the example, the data structure comprises the items required to perform system checks to aid in determining potential conflicts on a user's system. The aforementioned example is not meant to limit the present invention in any way.

The agent application is host-based software, pre-installed on an end user system. The application is an interpreter for the data structure downloaded from the central expert system library and a library of functions. The functions primarily access information about a user's system or remediate a user's system. For example, one function is able to query an operating system to determine if it has a certain patch installed, and another function is able to install the patch. The agent application is also responsible for reporting problems found. Other functions of the agent application include, but are not limited to, accessing hardware error counts, reading/writing the Windows® registry, accessing software modules and version/patch levels, moving, copying and removing files from the file system, reading operating system environment such as memory and disk space, updating virtual memory configurations and many other functions to maintain a stable environment.

The expert system library utilizes a plug-in architecture. Each expert system library record has functionality of a discrete program such that each entry is able to be added to the expert system library without affecting the other expert system library entries and updated or removed from the expert system library with no effect on the other problem records. Such a plug-in architecture allows multiple authors to maintain different problem records independently of simultaneous work being done on other problem records.

The expert system library data structure includes procedural language elements including, but not limited to, boolean logic, string manipulation, flow control verbs and simple match functions. The language provides a system interpretation tightly integrated with the operating system. The language is used to create powerful and flexible mechanisms to test for the existence of problem conditions. For example the following language function tests the Windows® registry for the existence of a value:

```
str regvalue
str regkey
regkey =
"\HKEY_LOCAL_MACHINE\SOFTWARE\Microsoft\WindowsNT\
CurrentVersion\Hotfix\Q31 2895"
regvalue = F$GETREG(regkey)
if (regvalue != "<error>") then
    return 9 //signal hotfix not installed
else
    return 0 //signal hotfix installed
endif
```

The example language checks if the value of the Windows® registry value at Q312895 is an error. If the value is not an error, then the Microsoft® patch is installed. Further, the routine is able to check for one or more code modules which are supposed to be updated by this patch. If the code module version is less than the correct value, then the registry has the patch recorded as installed, but the actual code module could be below the correct value, which would mean the patch was installed but the installation failed.

The language interpreter, part of the agent application, contains a set of functions which are called the Expert System Library Data Language. The functions are specific to operating environments, but operate the same for the Expert System Library Data Language. The operating environments where the functions reside could include Microsoft® Windows®, Microsoft® CE, Unix, Linux, handheld operating systems, cell phone operating systems as well as others. The function portability allows the present invention to be implemented across many different platforms.

Since the functions are created in the specific operating system environment, the functions are able to reach into the operating system environments to retrieve specific and detailed data. Examples of such functions include, but are not limited to: Read Windows Registry Value, Check Device Error Counter Values, Check File System Organizations and Structures, Check File Modules and File Version Values, Check for Installation of Specific Applications, Read Environmental Values and Counters, Read Windows Event Log Entries as well as other functions to retrieve specific data.

Figure 5:
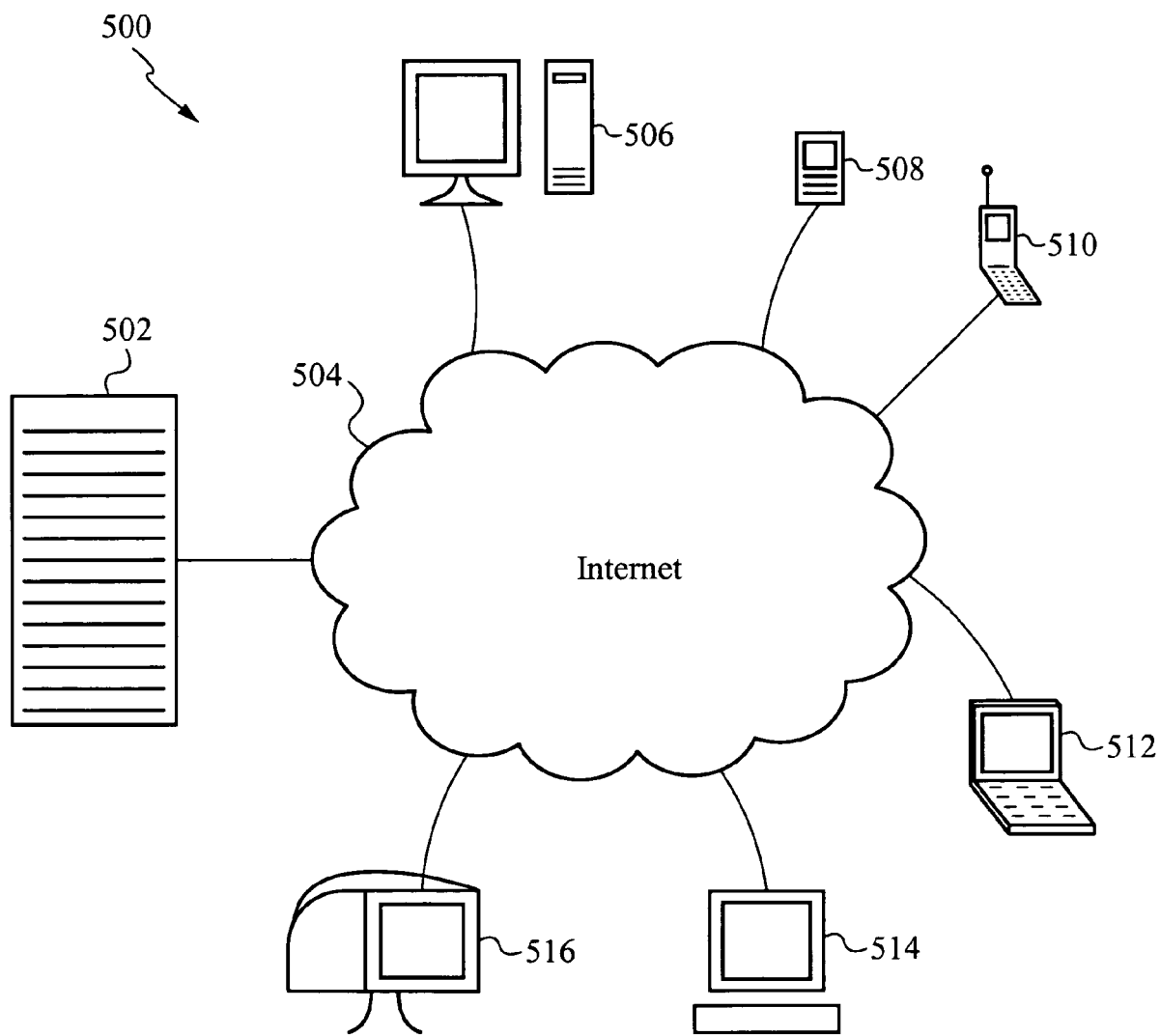
FIG. 5 illustrates a network implementing the preferred embodiment of the present invention.

FIG. 5 illustrates a network implementing the preferred embodiment of the present invention. The present invention is implemented over a network of devices 500. The expert system library is stored on a server 502 that is coupled to the Internet 504 in a preferred embodiment. In alternative embodiments, the server 502 is coupled to a company intranet or other types of networks such as a Local Area Network (LAN), Wide Area Network (WAN) or a Metropolitan Area Network (MAN). In yet other alternative embodiments, the expert system library is stored on one or more servers. Furthermore, the coupling between the server 502 and the Internet 504 is able to be via networking cables or wireless means. The Internet 504 is also coupled to a variety of computing devices that have the agent application stored on them. The computing devices include, but are not limited to, a personal computer 506, a PDA 508, a cell phone 510, a laptop computer 512, a thin client 514 or an Apple personal computer 516. The agent application retrieves problem data from the expert system library on the server 502. Then, the agent application on the computing devices checks to determine if there are any problems in the system. If any problems are discovered, the agent application alerts the user and/or attempts to remediate the issue using a script. If an unknown problem occurs without being detected, the reporting mechanism sends feedback to the server 502, so that the expert system library is able to learn of the issue and is able to detect such a conflict in the future. Thus, users of the system are able to feel comfortable they are working on a safe and secure environment and when there are undiscovered issues, with a large network of people, these undiscovered issues will be noticed and recorded so that other users' systems are able to resolve such issues.

The present invention supports subscription licenses, so that when the subscription is void or expired, the desktop software will be disabled and inactive. With respect to subscriptions, the present invention has interfaces for billing support.

An additional feature of the present invention includes offline operation. The software has the ability to run disconnected form the central server and network. The drawback with offline operation is that a user must install some if not all of the expert system library, so that it is able to be utilized locally. Furthermore, if an issue arises, the feedback mechanism is not able to communicate with the expert system library, thus the expert system library will be limited in its growth capabilities. Special preparations must be taken for proper offline functionality to ensure that required licenses and subscriptions are abided by.

To utilize the present invention, in the preferred embodiment, an end user computer has the agent application pre-installed. In an alternative embodiment, a user has to install the agent application after either downloading it or via CD. Once the agent application exists on the user's computer, it interrogates the user system for the basic environment. The agent application then retrieves problem data from the expert system library pertinent to the user's operating environment. The agent application tests the user's system for each problem description within the downloaded data structure from the expert system library. If a problem is discovered, then a script will attempt to remediate the problem and/or a notification will be sent to the user describing the issue such as "patch X is missing, go to www.findpatch.com to download and install the patch." If a problem unknown to the expert system library arises, a feedback mechanism sends a notification to the expert system library that a problem was discovered. In the preferred embodiment the feedback is automatically sent via software. In an alternative embodiment, the feedback is sent via a user reporting the problem. The feedback is then utilized by the expert system library to increase the total knowledge. Then when another user with a similar or the same setup is tested, the agent application will recognize the issue and will take the appropriate actions to handle it. In time, the number of problems able to be detected and resolved will increase, thus creating a more secure and stable environment.

In operation, the present invention assists users in detecting potential problems and conflicts that a typical user is unaware of. Other programs attempt to detect specific problems, but they are insufficient to ensure an overall stable environment. The present invention not only checks for software conflicts; it also checks for conflicts within the operating system for hardware conflicts as well. When a conflict or problem does arise, the present invention utilizes scripts to attempt to resolve the problem and further reports these conflicts to the user. Furthermore, the agent application which monitors a user's computer is coupled to a feedback mechanism which is able to send data to the expert system library so that the expert system library is able to learn and expand to handle new potential conflicts. Since the expert system library is continuously expanding with new knowledge, once a new problem is discovered, the agent application is able to aid future users to resolve the problem. Ultimately, the present invention could potentially continue to gain knowledge to the point where most, if not all, conflicts and problems have been discovered and will be resolvable before any detriment comes to the user's system.

Within the present application, software includes programs, applications, scripts, system software, middleware in addition to any other generally known meaning of software.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for detecting problems within a computer system comprising:
   a. an expert system library for storing information including system data; and
   b. an agent coupled to the expert system library for using the information stored in the expert system library to detect and resolve one or more problems within the computer system.

2. The system as claimed in claim 1 further comprising a feedback mechanism for sending feedback to the expert system library.

3. The system as claimed in claim 2 wherein the feedback is data related to a conflict within the computer system.

4. The system as claimed in claim 1 wherein the system data relates to one or more software packages, hardware devices and operating systems.

5. The system as claimed in claim 4 wherein the system data further relates to one or more conflicts between the software packages, hardware devices or operating systems.

6. The system as claimed in claim 1 further comprising one or more scripts for remedying the one or more problems.

7. The system as claimed in claim 1 further comprising a reporting mechanism to report the one or more problems.

8. The system as claimed in claim 1 wherein the expert system library receives input from multiple sources.

9. The system as claimed in claim 1 wherein the system is implemented on an application service provider infrastructure.

10. The system as claimed in claim 1 wherein business enterprise applications are implemented on the system.

11. The system as claimed in claim 1 wherein the system functions offline.

12. The system as claimed in claim 1 wherein the system is scaleable to support large application service provider bases.

13. The system as claimed in claim 1 wherein the system is implemented on disparate network topologies.

14. The system as claimed in claim 1 further comprising a license/subscription scheme.

15. The system as claimed in claim 1 wherein the expert system library is contained on one or more servers.

16. The system as claimed in claim 15 wherein the one or more servers are selected from the group consisting of entry-level servers, mid-range servers, enterprise servers, personal computers, Apple computers, thin clients, laptops, cell phones and PDAs.

17. The system as claimed in claim 1 wherein the agent is contained on one or more computing devices.

18. The system as claimed in claim 17 wherein the computing devices are selected from the group consisting of personal computers, Apple computers, thin clients, laptops, cell phones and PDAs.

19. The system as claimed in claim 1 wherein the agent functions on an operating system selected from the group consisting of Microsoft® Windows®, Microsoft® CE, Unix, Linux, handheld operating systems and cell phone operating systems.

20. The system as claimed in claim 1 wherein the system is implemented on a network.

21. The system as claimed in claim 1 wherein the expert system library and the agent are not on the same computing device or server.

22. A system for detecting problems within a computer system comprising:
 a. one or more servers;
 b. one or more computing devices coupled to the one or more servers for computing data;
 c. an expert system library contained within the one or more servers for storing information including system data;
 d. an agent contained within the one or more computing devices for using the information stored in the expert system library to check for and resolve problems within the computer system; and
 e. a feedback mechanism contained within the one or more computing devices for sending feedback to the expert system library.

23. The system as claimed in claim 22 wherein the feedback is information related to a conflict.

24. The system as claimed in claim 22 wherein the system data relates to one or more software packages, hardware devices and operating systems.

25. The system as claimed in claim 24 wherein the system data further relates to one or more conflicts between the software packages, hardware devices or operating systems.

26. The system as claimed in claim 22 further comprising one or more scripts for remedying the one or more problems.

27. The system as claimed in claim 22 further comprising a reporting mechanism to report the one or more problems.

28. The system as claimed in claim 22 wherein the expert system library receives input from multiple sources.

29. The system as claimed in claim 22 wherein the system is implemented on an application service provider infrastructure.

30. The system as claimed in claim 22 wherein business enterprise applications are implemented on the system.

31. The system as claimed in claim 22 wherein the system functions offline.

32. The system as claimed in claim 22 wherein the system is scaleable to support large application service provider bases.

33. The system as claimed in claim 22 wherein the system is implemented on disparate network topologies.

34. The system as claimed in claim 22 further comprising a license/subscription scheme.

35. The system as claimed in claim 22 wherein the one or more computing devices are selected from the group consisting of personal computers, Apple computers, thin clients, laptops, cell phones and PDAs.

36. The system as claimed in claim 22 wherein the one or more servers are selected from the group consisting of entry-level servers, mid-range servers, enterprise servers, personal computers, Apple computers, thin clients, laptops, cell phones and PDAs.

37. The system as claimed in claim 22 wherein the agent functions on an operating system selected from the group consisting of Microsoft® Windows®, Microsoft® CE, Unix, Linux, handheld operating systems and cell phone operating systems.

38. The system as claimed in claim 22 wherein the system is implemented on a network.

39. The system as claimed in claim 22 wherein the expert system library and the agent are not on the same computing device or server.

40. A method of detecting problems within a computer system comprising:
 a. interrogating a computing device for environment information;
 b. retrieving data from an expert system library related to the environment information;
 c. testing the computing device for one or more problems; and
 d. using the data stored in the expert system library to resolve the one or more problems within the computer system.

41. The method as claimed in claim 40 further comprising reporting the one or more problems to a user.

42. The method as claimed in claim 40 further comprising initiating one or more remediation scripts if the one or more problems are detected.

43. The method as claimed in claim 40 further comprising sending feedback to the expert system library.

44. The method as claimed in claim 40 wherein the expert system library receives input from multiple sources.

45. The method as claimed in claim 40 wherein the method is implemented on an application service provider infrastructure.

46. The method as claimed in claim 40 wherein business enterprise applications are implemented on the computing device.

47. The method as claimed in claim 40 wherein the method functions offline.

48. The method as claimed in claim 40 wherein the method is scaleable to support large application service provider bases.

49. The method as claimed in claim 40 wherein the method is implemented on disparate network topologies.

50. The method as claimed in claim 40 further comprising implementing a license/subscription scheme.

51. The method as claimed in claim 40 wherein the expert system library is contained on one or more servers.

52. The method as claimed in claim 51 wherein the one or more servers are selected from the group consisting of entry-level servers, mid-range servers, enterprise servers, personal computers, Apple computers, thin clients, laptops, cell phones and PDAs.

53. The method as claimed in claim 40 wherein the computing device is selected from the group consisting of a personal computer, an Apple computer, a thin client, a laptop, a cell phone and a PDA.

54. The method as claimed in claim 40 wherein the method is implemented on a network.

55. A network of devices for detecting problems within a computer system comprising:
   a. one or more servers;
   b. one or more computing devices coupled to the one or more servers for computing data;
   c. an expert system library contained within the one or more servers for storing information including system data;
   d. an agent contained within the one or more computing devices for using the information stored in the expert system library to check for and resolve problems within the computer system; and
   e. a feedback mechanism contained within the one or more computing devices for sending feedback to the expert system library.

56. The network of devices as claimed in claim 55 wherein the feedback is information related to a conflict.

57. The network of devices as claimed in claim 55 wherein the system data relates to one or more software packages, hardware devices and operating systems.

58. The network of devices as claimed in claim 57 wherein the system data further relates to one or more conflicts between the software packages, hardware devices or operating systems.

59. The network of devices as claimed in claim 55 further comprising one or more scripts for remedying the one or more problems.

60. The network of devices as claimed in claim 55 further comprising a reporting mechanism to report the one or more problems.

61. The network of devices as claimed in claim 55 wherein the expert system library receives input from multiple sources.

62. The network of devices as claimed in claim 55 wherein the network of devices is implemented on an application service provider infrastructure.

63. The network of devices as claimed in claim 55 wherein business enterprise applications are implemented on the network of devices.

64. The network of devices as claimed in claim 55 wherein the network of devices functions offline.

65. The network of devices as claimed in claim 55 wherein the network of devices is scaleable to support large application service provider bases.

66. The network of devices as claimed in claim 55 wherein the network of devices is implemented on disparate network topologies.

67. The network of devices as claimed in claim 55 further comprising a license/subscription scheme.

68. The network of devices as claimed in claim 55 wherein the one or more computing devices are selected from the group consisting of personal computers, Apple computers, thin clients, laptops, cell phones and PDAs.

69. The network of devices as claimed in claim 55 wherein the one or more servers are selected from the group consisting of personal computers, Apple computers, thin clients, laptops, cell phones and PDAs.

70. The network of devices as claimed in claim 55 wherein the agent functions on an operating system selected from the group consisting of Microsoft® Windows®, Microsoft® CE, Unix, Linux, handheld operating systems and cell phone operating systems.

71. The network of devices as claimed in claim 55 wherein the expert system library and the agent are not on the same computing device or server.

72. A system to detect problems within a computer system comprising:
   a. an expert system library to store information including system data;
   b. an agent coupled to the expert system library to use the information stored in the expert system library to detect and resolve one or more problems within the computer system;
   c. a feedback mechanism to send feedback to the expert system library;
   d. one or more scripts to remedy the one or more problems; and
   e. a reporting mechanism to report the one or more problems.

* * * * *